Dec. 30, 1952  G. P. HARRINGTON  2,623,721
AIRCRAFT STRUCTURE
Filed Dec. 18, 1945  3 Sheets-Sheet 1
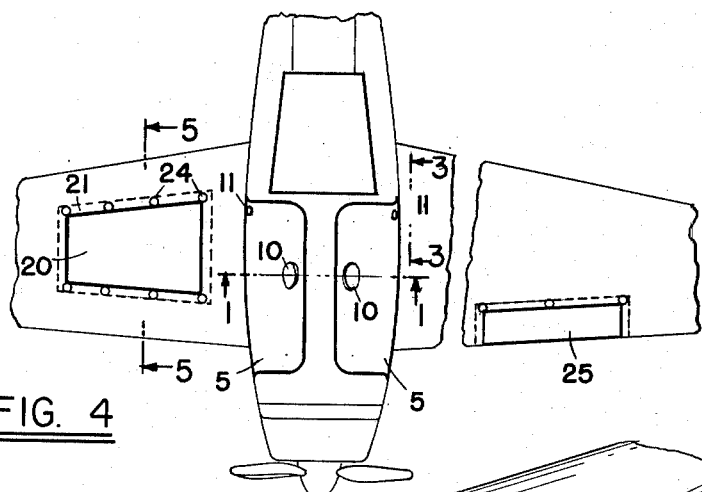
FIG. 4
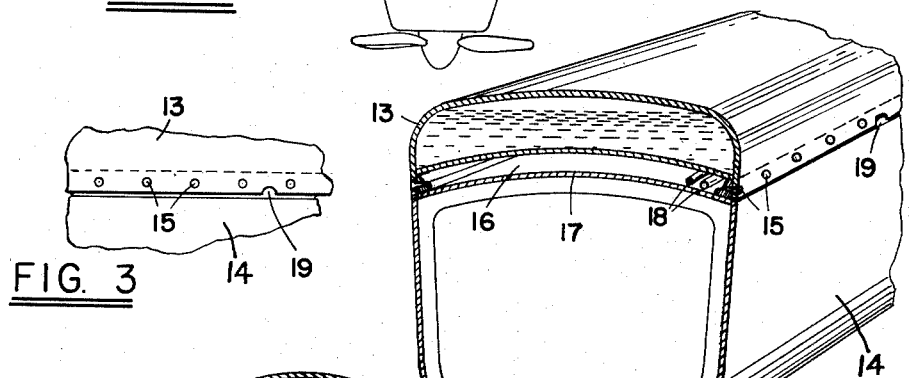
FIG. 3
FIG. 2
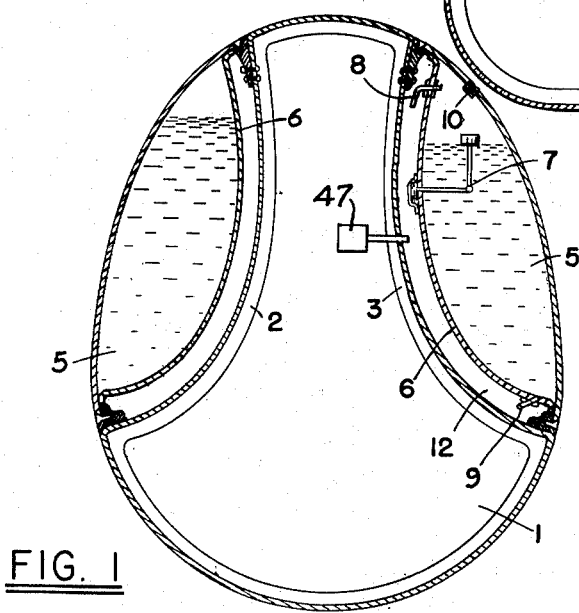
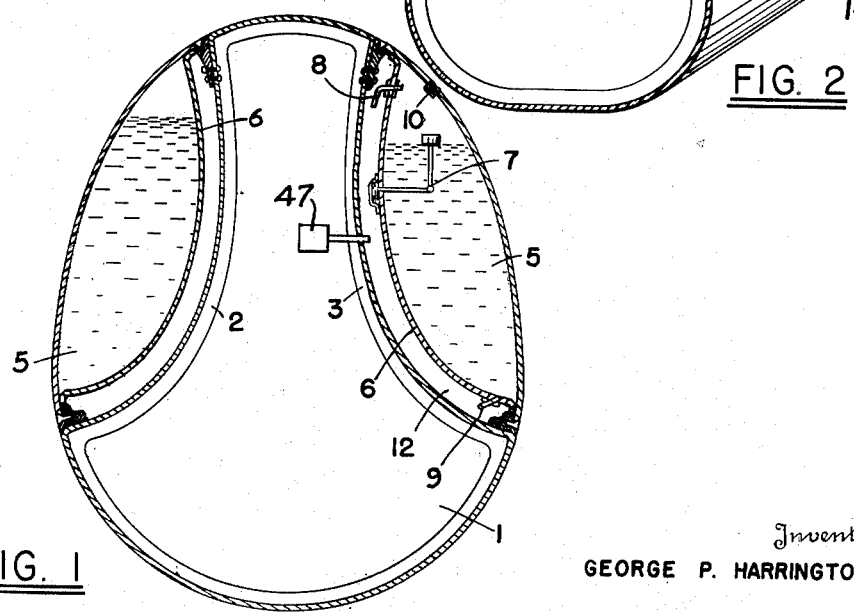
FIG. 1
Inventor
GEORGE P. HARRINGTON
By M. Q. Hayes
Attorney Dec. 30, 1952  G. P. HARRINGTON  2,623,721
AIRCRAFT STRUCTURE
Filed Dec. 18, 1945  3 Sheets-Sheet 2

Inventor
GEORGE P. HARRINGTON

Dec. 30, 1952　　　G. P. HARRINGTON　　　2,623,721
AIRCRAFT STRUCTURE
Filed Dec. 18, 1945　　　　　　　　　　　　3 Sheets-Sheet 3
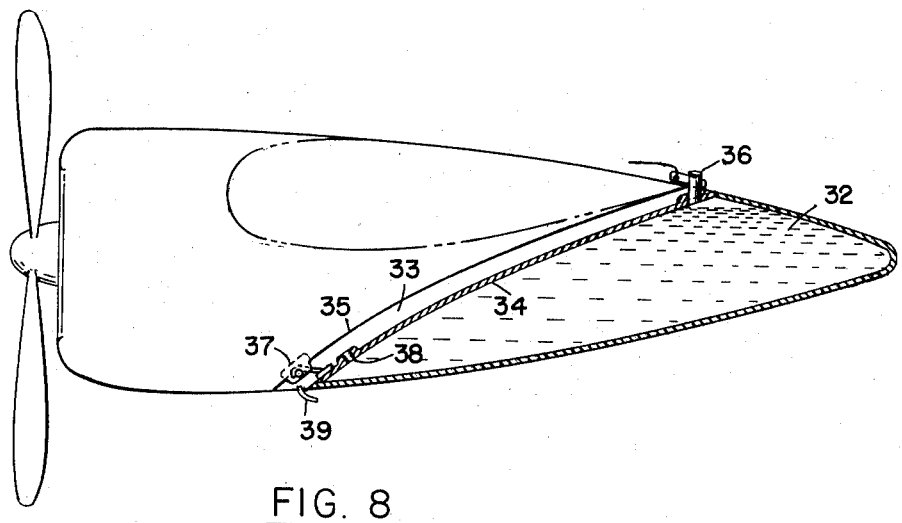
FIG. 8
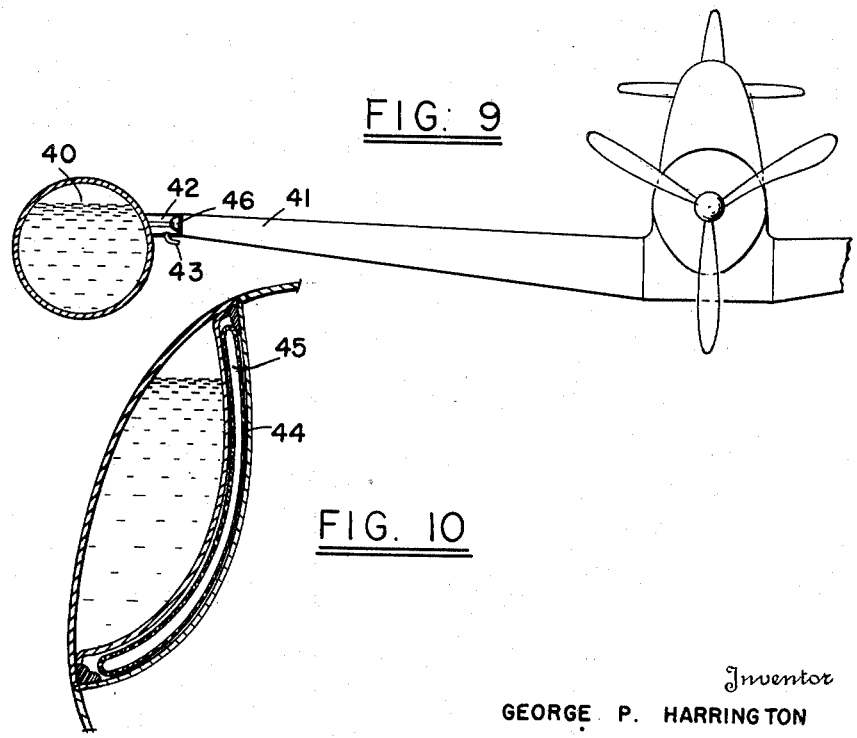
FIG. 9
FIG. 10
Inventor
GEORGE P. HARRINGTON
By
M. O. Hayes
Attorney Patented Dec. 30, 1952

2,623,721

UNITED STATES PATENT OFFICE 2,623,721

AIRCRAFT STRUCTURE

George P. Harrington, Washington, D. C.

Application December 18, 1945, Serial No. 635,820

3 Claims. (Cl. 244—135)

(Granted under the act of March 3, 1883, as amended April 30, 1928; 370 O. G. 757)

This invention relates to aircraft construction and more particularly to the fuel and oil systems used therein, as well as reservoirs for other inflammable materials, whereby to reduce the fire hazard and to provide for releasing of fuel or other tanks while in flight, and for easy replacement and loading.

The usual arrangement provides for metal, bladder, or self-sealing tanks positioned inside of a wing or fuselage structure. This is a hazardous practice because leakage or seepage into the surrounding spaces, from the tank, selector valves, lines, etc., can result in a fire or explosion. This applies not only when the airplane is subjected to gunfire or crashes but even to normal operations. Tests indicate that fuel or fuel vapor is usually safe when on the rich side of the explosive mixture curve. However, it is too often hazardous when on the lean side of the theoretical explosive range. The present self-sealing tanks provide only partial protection against fires. With self-sealing tanks in an airplane structure a .50 calibre incendiary bullet will start a fire in most cases; a 20 mm. incendiary impact will result in a fire in practically all cases. Fragments of anti-aircraft shells and even inert bullets will usually spark against the skin and structure of the airplane and, if fuel or fuel vapor is present, a fire or explosion will occur. Self-sealing tanks in the present weights are not effective for pressurized tanks, nor will they seal satisfactorily for lubricating oil, kerosene, or alcohol. In some capacities and shapes the self-sealing tanks are excessively heavy. Self-sealing tanks are subject to deterioration and injury and in many recorded cases have presented a fire hazard during non-combat flights. Integral fuel tanks, which utilize the structural portions of the wing or fuselage, have been a very serious maintenance problem. If subject to gunfire the hydraulic shock may cause considerable damage to the airplane structure. In a crash the seams may split and cause serious fuel spillage. Any damage to the vertical bulkheads of an integral tank may result in fuel and fire flooding the entire wing or fuselage. Droppable fuel tanks of conventional teardrop design are relatively safe in that external fires will be swept away if the airspeed exceeds the propagation rate of flame, approximately 90 miles per hour. However, external droppable tanks mounted under the airplane are usually not aerodynamically efficient. It is usually impractical to carry sufficient fuel in external tanks alone.

The primary object of this invention is to provide improved protection against fires and explosions which may occur inside or around tanks for inflammable fluids. While reference is made in the following to fuel, the particular tank design is equally applicable to aviation gasoline, kerosene, lubricating oil, hydraulic fluids, alcohol, and other inflammable or explosive items carried in aircraft.

Another object is to provide reasonably safe stowage of fuel with the minimum of weight penalty.

A further object is to provide maximum aerodynamic efficiency for the degree of safety obtained.

A still further object is to provide a system reasonably easy to maintain and which will permit replacements with the minimum of overhaul time.

Other and more specific objects will appear in the following detailed description of several illustrative forms of the invention, having reference to the accompanying drawings, wherein:

Fig. 1 illustrates in section one typical installation of tank structure built in accordance with the present invention;

Fig. 2 is a partial perspective sectional view of another installation;

Fig. 3 is a side view of a detail of the form shown in Fig. 2;

Fig. 4 shows more or less diagrammatically the possible arrangements of tanks in the fuselage sides, and in the wing structure;

Figs. 8 and 9 are other forms of tank installations; and

Fig. 10 is a sectional view of an installation similar to that in Fig. 1 but having a bladder containing inert gas or other chemicals, filling the space between the tank and the fuselage bulkhead.

Figure 5:
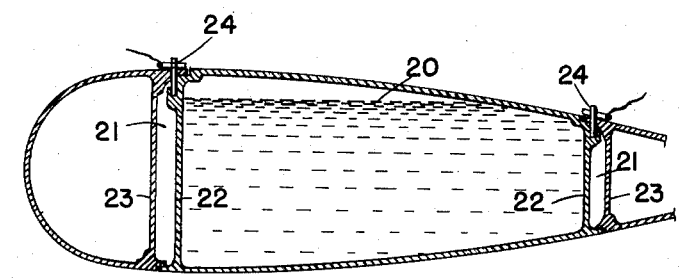
Fig. 5 is a sectional view of a wing installation.

The fuel tanks described in the following paragraphs provide for at least partial external fuel surfaces in that the external surface or surfaces of the tank either comprise or are immediately adjacent to the skin of the airplane. While the exact shape of the tank may be varied according to the particular airplane proportions, the fundamental design follows the general pattern described in the following.

Fig. 1 illustrates a typical installation of tanks in the fuselage of an airplane. The fuel tanks are arbitrarily located in the sides, although the top or bottom of the fuselage may be selected. In a combat airplane it is conceivable that with fuel placed over the fuselage spillage into the cabin might be excessive. In either a combat or commercial airplane it is considered that placing the tank under the fuselage might involve considerable risk in the event of a crash. While it is possible that the tank or tanks could project from the fuselage, it is considered advantageous for aerodynamic efficiency that the main structure be indented to provide a well for the tank. With the outside portion of the tank becoming the desired contour of the airplane the drag is reduced and efficiency is satisfactory. Thus in Fig. 1, the fuselage structure 1 has well portions 2 and 3 in its sides for the tanks 5 respectively.

The inside surfaces 6 of the tanks are located in spaced relation to the indented or recessed main structure in order to accomplish part or all of the following: first, to provide room for fuel lines, sumps, selector valves, fire extinguisher lines, purging lines, etc.; second, to provide room for rapid ventilation and drainage; third, to provide sufficient spacing to minimize fuel, leaking from the tank, entering a gunfire wound in the structural bulkhead; fourth, to provide room for the tank to expand under gunfire without hydraulic shock damage to the airplane structure. Although shown rigidly connected, the tanks may be either rigidly or flexibly mounted to the main fuselage structure.

Tank 5 is shown with a level gauge 7, a vent 8, outlet 9, and filler cap 10. A suitable drain, not shown, and having closure means therefor, not shown, may be provided at the lowermost point of the space 12. The space 12 may be made airtight and the pressure therein maintained by pump 47 at lower than that in the fuselage compartment so as to reduce the possibility of leakage of any fuel or combustible fumes in this space into the fuselage compartment. For pressurized fuselage compartments at high altitudes, this space may be open to the atmosphere, otherwise it may be held at sub-atmospheric pressure.

In Figs. 2 and 3, the tank 13 is spacedly mounted over the top of the fuselage 14 to form a continuous faired outer surface. It may be rigidly fixed along the sides by screws 15. The space 16 between the tank and the bulkhead 17 may provide room for sump lines, etc. 18, and may be held at a lower pressure than in the fuselage compartment for reasons given above. A drain opening 19 may be provided, as shown, near the rear end of the space 16.

Figure 6:
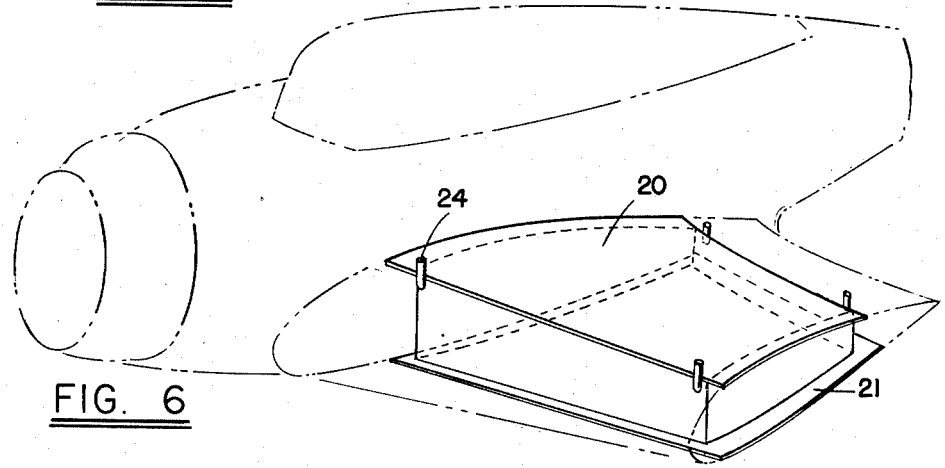
Fig. 6 is a diagrammatic perspective view of the installation of Fig. 5.

For wing tanks it is generally advisable to place the tank of the general type just described in a cavity or indentation between spars, as shown at 20 in Figs. 4, 5 and 6. Sufficient space 21 may then be provided between the vertical walls 22 of the tank and the vertical bulkhead portions 23 of the wing. The bottom of the tank becomes either a part of the bottom wing surface or else is immediately adjacent to the bottom skin of the wing. Unless a secondary lid or a structural top skin is provided, the roof of the tank becomes part of the top surface of the wing. In the event it is considered advisable to utilize the leading edge of the wing for fuel the design follows that indicated in outline at 25 on the right side in Fig. 4. In either type of tank, releasable mounting means 24 may be provided for dropping the tanks when desirable.

Although not essential, it is desirable that the bulkheads of the main airplane structure be made of fire resistant material. The bulkheads and main airplane structure should be relatively stronger than the mounted fuel tank. The tank itself may be made of either metal or non-metallic material, or any combination found suitable.

The above described tank arrangement permits effective protection against lethal damage to the airplane and its passengers in the event a fire or explosion occurs inside or around the tank. Properly proportioned and mounted the arrangement provides protection against operational difficulties such as usually occurs when a fuel line fails, or damage incident to gunfire or a crash. In the event fuel leakage occurs in the space between the inside walls of the tank and the structural part of the airplane it is proposed that the fumes would be eliminated by ram air, either administered continuously or by manually or automatically controlled shutters. A drainage hole or shutter would similarly be provided to eliminate the fumes and, if present, the inflammable fluid. An alternate provision would include a bleed-in for an inert gas such as nitrogen, carbon dioxide or exhaust gas, which also could be administered to the inside of the tank. A further provision may include fire extinguisher piping, between the tank and the main structural bulkhead.

The advantages of the above arrangement are important. In the event the skin of the airplane at the fuel tank is pierced by an incendiary or explosive bullet (or by a piece of flak, which also usually carries a flash of flame) a fire would probably result but it would be quickly eliminated by the flow of air with the airplane in flight. The entry of the incendiary or explosive bullet into the tank would not result in a fire assuming the fuel-vapor mixture is sufficiently rich. In a large proportion of the cases there will be no exit since the fuel will brake and eventually stop the projectile. In the event the projectile exits and pierces the main structural bulkhead there may be a fire, but in practically all cases it will be confined to the space between this bulkhead and the interior surface of the tank. Under such conditions the fire could be easily extinguished, or it may quickly burn out. The probability of a large fire inside of the main structural bulkhead is small because little or no fuel will find its way into and through the wound. Any fire in this particular space will disturb the spurt from the fuel tank; also, the change of head of fuel will alter the degree of spurt to the extent that a very small quantity of fuel could enter the main portion of the airplane structure. Pressurizing the fuselage (or wing) to a pressure above that in the space between the tank and the main bulkhead would practically eliminate all possibility of fuel entering the main part of the airplane structure. Small fuel fires can be combatted in the fuselage at least, with hand extinguishers. An explosion or serious fire may cause the tank to drop off, or, if advisable, provision could be made for automatic or manual control release of the tank. With the cavity or well provided for the fuel tank properly designed the airplane could remain in flight with the tank eliminated.

Further refinements possible in the tanks and in the method of attachment include compartmentation of the tanks into small sections and flexible mounting, to reduce the possibility of the tank rupturing in a crash.

Figure 7:
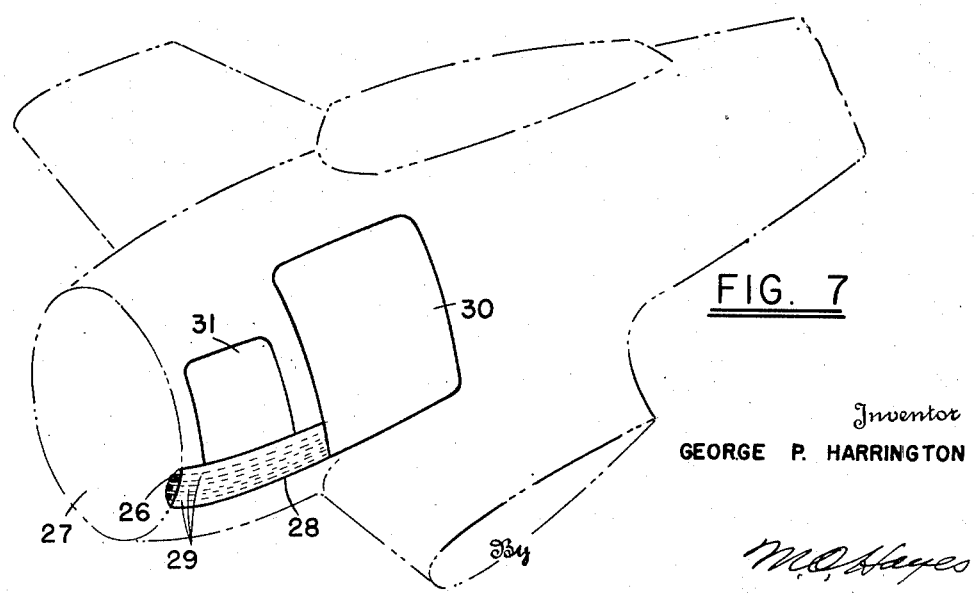
Fig. 7 is a diagrammatic perspective view of a fuselage installation of fuel and oil tanks and inflammable conduit passage separated by a structural bulkhead from the fuselage compartment.

Borrowing from the tank design, it is possible to similarly protect the inflammable fluid lines 29, as indicated in Fig. 7, by running them through a passageway 28 adjacent the surface of the fuselage and formed by a bulkhead 26 separating it from the fuselage compartment 27. The fuel tank 30 and oil tank 31 may be formed in cavities in the side of the fuselage. Fuel shut-offs, fire detectors, explosion meters, crash switches, and other devices may be utilized as considered practicable.

Other arrangements of tanks are shown in Figs. 8 and 9. The nacelle installation in Fig. 8 incorporates a tank 32 faired into the nacelle as shown, a space 33 being provided between the internal portion of the tank wall 34 and the fumetight bulkhead 35. The tank may be provided with a releasable mounting comprising lock pin devices 36 and hooks 37. An outlet 38 for the tank and a drain 39 for the space may be provided as indicated.

In Fig. 9, an arrangement for mounting the tanks at the ends of the wings is shown. The tank 40 may be of teardrop form, circular in section, and is attached to the end of the wing 41 with an intervening space 42 having a drain 43 and a fumetight bulkhead 46.

A further modification of tank installation is shown in section in Fig. 10 where a bladder 44 of nylon or other flexible and preferably fire resistant material may be used to hold an inert gas or other chemical within the space 45 for snuffing out or quenching a flaming missile piercing the tank and airplane structure back of it, as the missle passes through the bladder.

The fundamental design incorporates a tank of the type described, a surface portion of which is either part of the airfoil surface of the airplane, or is immediately adjacent to a part of the airfoil surface and another portion which is in spaced relationship to the airplane structure, together with suitable mounting arrangement by which the tank is attached to the airplane structure permanently or by releasable means.

There are many other modifications that may be made in the form and arrangement of parts without departing from the spirit and scope of the present invention, as defined in the appended claims.

The invention described herein may be manufactured and used by or for the Government of the United States of America for governmental purposes without the payment of any royalties thereon or therefor.

What is claimed is:

1. In an aircraft structure having a generally faired skin forming a surface and providing a streamlined recessed portion to define a cavity, the recessed portion of said skin forming a fire wall, first wall means fitted into said cavity and mounted in spaced relation and generally parallel to said fire wall, second wall means enclosing said cavity and forming with said first wall means a reservoir, said second wall means being faired with the surface of said skin to form a continuous streamlined surface for said structure, and bladder means fitted into the space between said first wall and said streamlined recessed portion, said bladder means containing inert gas or other chemical material for the purpose of quenching any fire missile that may pierce through said structure and reservoir.

2. In an aircraft structure having a generally faired skin forming a surface and providing a streamlined recessed portion to define a cavity, the recessed portion of said skin forming a fire wall, first wall means fitted into said cavity and mounted in spaced relation and generally parallel to said fire wall, second wall means enclosing said cavity and forming with said first wall means a reservoir, said second wall means being faired with the surface of said skin to form a continuous streamlined surface for said structure, and fluid means operatively associated with said space for minimizing the collection of fumes in said structure when said wall means is pierced by a bullet and thereby reducing the danger of fire.

3. In an aircraft structure having a generally faired skin forming a surface and providing a streamlined recessed portion to define a cavity, the recessed portion of said skin forming a fire wall, first wall means fitted into said cavity and mounted in spaced relation and generally parallel to said fire wall, second wall means enclosing said cavity and forming with said first wall means a reservoir, said second wall means being faired with the surface of said skin to form a continuous streamlined surface for said structure, and pump means in communication with said space for maintaining a lower pressure in said space than in said structure.

GEORGE P. HARRINGTON.

REFERENCES CITED

The following references are of record in the file of this patent:

UNITED STATES PATENTS

| Number | Name | Date |
|---|---|---|
| 1,548,336 | Siller | Aug. 4, 1925 |
| 1,553,122 | Thomas | Sept. 8, 1925 |
| 1,774,342 | Vought | Aug. 26, 1930 |
| 1,795,970 | Rochrbach | Mar. 10, 1931 |
| 1,946,185 | Bazley | Feb. 6, 1934 |
| 1,996,281 | Dolan | Apr. 2, 1935 |
| 2,010,817 | Henry | Aug. 13, 1935 |
| 2,105,307 | Akerman | Jan. 11, 1938 |
| 2,207,724 | Diehl | July 16, 1940 |
| 2,277,242 | Makaroff | Mar. 24, 1942 |
| 2,306,420 | Allen | Dec. 29, 1942 |
| 2,354,573 | Brock | July 25, 1944 |
| 2,403,754 | Pierson | July 19, 1946 |
| 2,404,418 | Walker | July 23, 1946 |
| 2,416,104 | Lerche | Feb. 18, 1947 |
| 2,421,699 | Johnson | June 3, 1947 |

FOREIGN PATENTS

| Number | Country | Date |
|---|---|---|
| 299,677 | Germany | June 19, 1920 |
| 371,954 | Germany | Mar. 22, 1923 |